United States Patent [19]

Sequin

[11] 4,432,538

[45] Feb. 21, 1984

[54] MACHINE TOOL CLAMP

[76] Inventor: Hector Sequin, 11902 W. Dakota Dr., Lakewood, Colo. 80228

[21] Appl. No.: 325,638

[22] Filed: Nov. 30, 1981

[51] Int. Cl.[3] .......... B23Q 3/02

[52] U.S. Cl. .......... 269/92; 269/93

[58] Field of Search .......... 269/91, 92, 93, 94, 269/239, 95

[56] References Cited

U.S. PATENT DOCUMENTS

| | | | |
|---|---|---|---|
| 1,536,310 | 5/1925 | Rothlisberger | 269/91 |
| 2,260,708 | 10/1941 | French | 269/239 |
| 3,227,438 | 1/1966 | Sequin | 269/94 |
| 3,436,072 | 4/1969 | Svenson | 269/94 |
| 4,294,442 | 10/1981 | Kolnes et al. | 269/239 |

FOREIGN PATENT DOCUMENTS

| | | | |
|---|---|---|---|
| 6063 | 5/1979 | European Pat. Off. | 269/91 |
| 47803 | 3/1978 | U.S.S.R. | 269/91 |

OTHER PUBLICATIONS

Western Electric Technical Digest, No. 58, Apr. 1980, "Workpiece Clamping Device", D. W. Savage.

*Primary Examiner*—Robert C. Watson
*Attorney, Agent, or Firm*—Young & Martin

[57] ABSTRACT

A machine tool clamp includes an elongated clamping member with its mid-section anchored at an adjustably spaced distance above a base plate. The front end of the clamping member is adapted to clamp a work piece to a machine tool work platform. The rear end or heel of the clamping member bears pivotally on the base plate in such a manner that the adjustable anchor of the mid-section is a movable fulcrum. A height adjustable mechanism with a large mechanical advantage is positioned in the heel of the clamping member to lever the clamping member about the adjustable fulcrum to clamp the front end on a work piece. The height adjustable mechanism can be a screw, eccentric cammed lever, hydraulic or pneumatic cylinder, or other suitable mechanism.

22 Claims, 10 Drawing Figures

MACHINE TOOL CLAMP

BACKGROUND OF THE INVENTION

The present invention relates to a new and useful machine clamp adapted for gripping a work piece to secure the work piece at a desired pre-selected location on a machine bed. This machine clamp is particularly adaptable for use with irregular work pieces to be milled, cut drilled or otherwise operated on by a machine tool and is constructed to quickly and easily grip both regular and irregular pieces at any position or any angle.

While various devices have been used to grip or clamp a work piece to a machine tool bed, often such clamps are unable to grip objects of irregular size and shape. A machinist must thus custom design a clamp structure for a special purpose with this special clamp being adaptable to the particular machine upon which the work is to be performed. Such clamps require the use of step blocks and shims where the step block is built up to be the same height as the work piece so the clamp can be secured in a position parallel to the machine bed. Such procedure is time consuming and expensive so that undue waste is introduced into the machining operation. These clamps must be completely assembled and disassembled for use on selected locations on the machine bench.

While several advantages over flat clamps and other prior art devices were provided by the machine clamp shown in my U.S. Pat. No. 3,227,438, issued Jan. 4, 1966, it is still desirable to have an inexpensive clamp with increased versatility and clamping strength. Further, it is desirable to have a clamp that is able to grip irregular objects quickly and easily while remaining attached to a machine bed.

SUMMARY OF THE INVENTION

It is therefore an object of the present invention to provide a novel machine clamping device that is quick and easy to use, yet which is versatile in clamping objects of irregular sizes and shapes on a machine work bed.

Another object of the present invention is to provide a clamping device for a machine which device has an increased gripping capacity for objects of various sizes and shapes.

A further object of the present invention is to provide a machine clamp which, while remaining attached to a machine work bed, can pivot into and out of a operative position to grip a work piece of an irregular size or shape.

A still further object of the present invention is to provide a machine clamp which can securely grip a work piece over an increased operative height above the work bed of a machine tool.

To accomplish these objects, the clamping device according to the present invention preferably includes a clamping member which is secured at a central portion to a base or mounting plate with the central portion of the clamp being movable in a direction toward and away from the base plate or a support that defines a movable fulcrum. The clamping member has a portion adapted for gripping and clamping a work piece. Adjustment means is provided on the opposite end of the clamp member so that this end is selectively movable toward and away from the base or mounting plate as well as to pivot the clamping member on the fulcrum thereby levering the gripping end against a work piece.

Preferably, the clamping member is an arcuate clamp arm having a central portion which receives a threaded guide post support mounted on a base plate. The clamp arm is retained on the post by a threaded knob or nut with the central portion of the clamping arm being sandwiched between a spring and the knob so that the clamp arm is biased towards the knob. Adjustment of the knob allows the central portion of the clamp arm to be moved toward and away from the base plate. A pair of gripping fingers extend outwardly from the central portion and are adapted to grip the work piece, and a heel portion extends outwardly from the central portion opposite the gripping fingers to be positioned adjacent the upper surface of the base plate. The heel portion has a bore extending therethrough in a direction perpendicular to the base plate with this bore being threaded to receive a large threaded bolt. Adjustment of this bolt forcibly moves the heel portion away from the base plate to lever the gripping fingers against a work piece. Preferably, the guide post interconnecting the central portion of the clamp arm and the base plate is slightly pivotal about the base plate and is received by the central portion of the clamp member in loose fitting engagement so that the clamp arm can be rocked with respect to the base plate. It is also preferred that the clamp member be rotatable about the axis of the guide post so that it can be rotated into and out of engagement with a work piece.

Alternate embodiments of the present invention provide different adjustment means on the heel portion of the clamping member. In a first alternate embodiment, the threaded bolt is omitted and the perpendicular bore through the heel portion is smooth. In this embodiment a hydraulic cylinder is mounted to the heel portion with the piston rod of the hydraulic cylinder extending through the smooth bore so that it abuts the base plate. Operation of the hydraulic cylinder extends the piston rod to move the heel portion of the clamping member away from the base plate. In the second alternate embodiment, the adjustment means for the heel portion is provided by a cam and lever assembly rather than the threaded bolt or hydraulic cylinder mechanisms described above. Also, any of the embodiments of the present invention may include a slide bracket to which the base plate is mounted. The slide bracket is secured to the work bed of the machine, and the base plate may then be moved along the slide bracket to a selected location.

These and other objects of the invention will become more readily appreciated and understood from a consideration of the following detailed description of the preferred embodiment when taken together with the accompanying drawings, in which:

DETAILED DESCRIPTION OF THE PREFERRED EMBODIMENT

Figure 1:
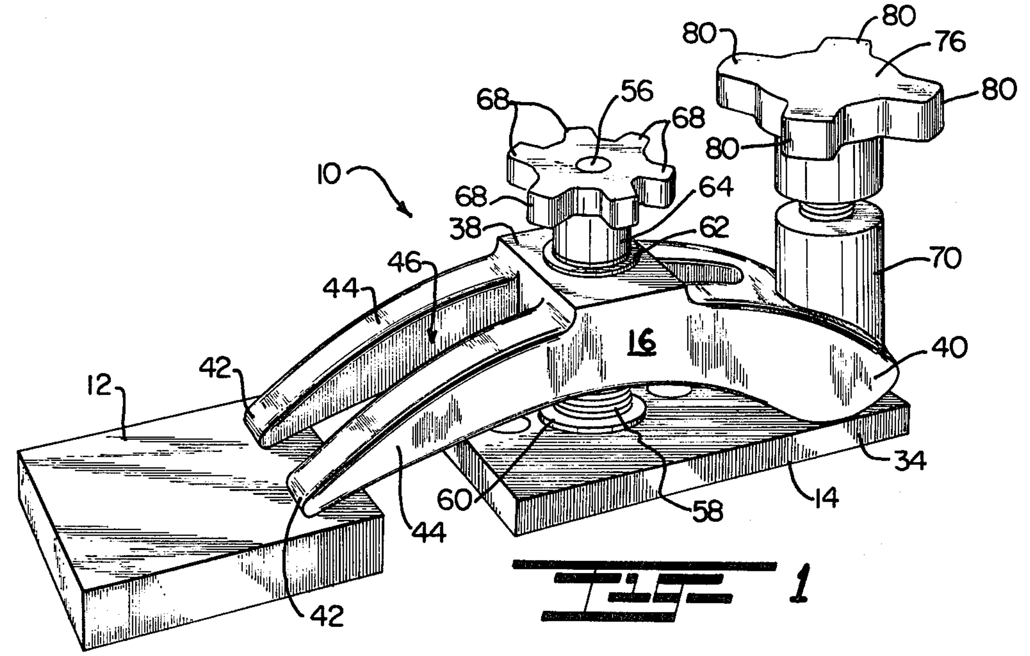
FIG. 1 is a perspective view of the machine clamp according to the preferred embodiment of the present invention.
Figure 2:
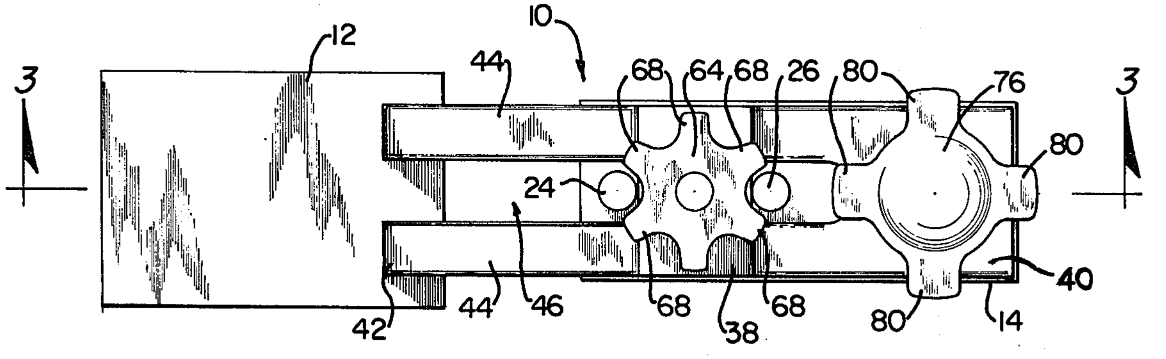
FIG. 2 is a top plan view of the clamping device shown in FIG. 1.
Figure 3:
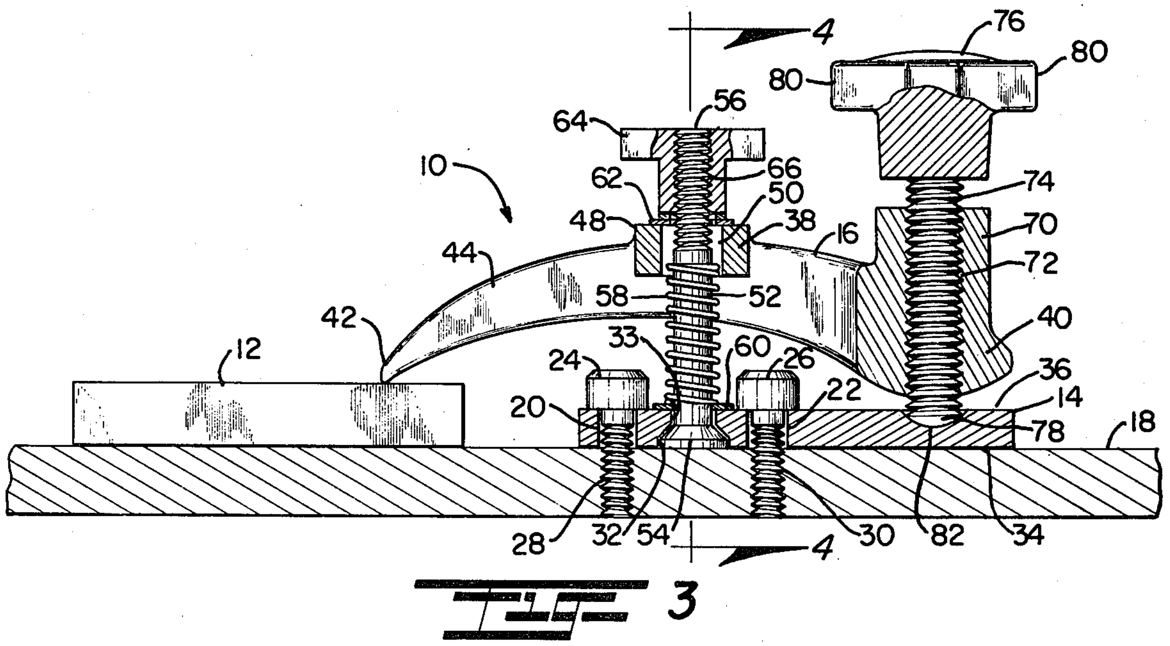
FIG. 3 is a cross-sectional view taken about line 3—3 of FIG. 2.
Figure 4:
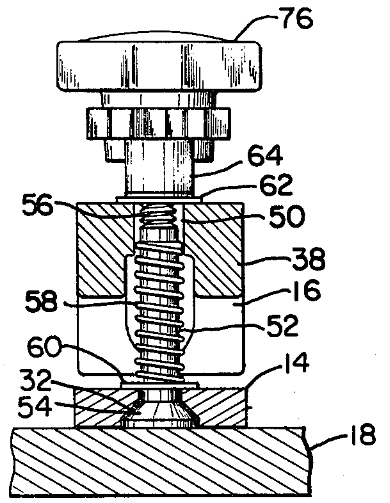
FIG. 4 is a cross-sectional view taken about line 4—4 of FIG. 3.

The present invention is directed to a new and useful clamping device for machine tools and the like which is especially adapted for gripping work pieces to a machine bed for milling, cutting, drilling or other machine operations. To accomplish this, the invention broadly includes a clamping member or clamp arm which is mounted to a base plate, preferably in a rotatable and pivotal manner. The clamp arm interacts with the base plate at two locations, one of which comprises a movable fulcrum and the other of which comprises an adjustment means for applying lever pressure to the work piece through the clamp arm. The parts of the clamp assembly are constructed out of high strength materials such a aluminum and steel in order to withstand large stresses applied during a clamping action.

The preferred embodiment of the present invention is shown in FIGS. 1-4 wherein clamping device 10 is adapted to clamp a work piece 12. Clamping device 10 includes a base plate 14 and a clamping arm or member 16 which is secured to base plate 14. Base plate 14 is in the form of a flat, rectangular metal plate which may be attached in any convenient manner to a work bench or bed 18. To accomplish this, a pair of hole 20 and 22 are formed in base plate 14, and a pair of bolts 24 and 26 pass through holes 20 and 22, respectively, to be received in threaded openings 28 and 30 in bed 18 so that bolts 24 and 26 firmly mount base plate 14 to bed 18. Base plate 14 includes a hole 32 between holes 20 and 22 with hole 32 being step-bored to have a larger diameter portion intersecting face 34 of base plate 14 adjacent bed 18 and a smaller diameter portion intersecting upper surface 36 of base plate 14 opposite surface 34. Step-bored hole 32 thus defines a shoulder 33.

Clamp arm or member 16 is constructed to have a central portion 38, a heel 40 and a gripping end 42 opposite heel 40. Gripping end 42 is preferably bifurcated into a pair of elongated gripping fingers 44 and extending outwardly from the central portion 39 and separated by a slot 46, as is shown in my U.S. Pat. No. 3,227,438. Preferably, clamp member 16 is constructed of a strong, rigid metal in a arcuate shape with heel 40 being enlarged with respect to fingers 44. Further, central portion 38 may be defined by a metalic block 48 welded or otherwise connected to fingers 44 to extend across slot 46 at a central location on arcuate clamping member 16. Metal block 48, which forms central portion 38, has a central hole or opening 50 adapted to receive a bolt 52.

Bolt 52 has an enlarged fustroconical head 54 at one end and a threaded shaft 56 at the opposite end and it defines a movable fulcrum means interconnecting base plate 14 with clamp member 16. Bolt 52 is mounted between base plate 14 and clamp member 16 by positioning bolt 52 through step-bored hole 32 so that fustroconical head 54 abuts shoulder 33. Thus, threaded end or shaft 56 extends upwardly from base plate 14. To complete the mounting of clamp member 16 to bolt 52, a washer 60 is placed around the shank of bolt 52 so that it rests on surface 36 of base plate 14 on a side of shoulder 33 opposite head 54. A coil spring 58 is positioned around the shank of bolt 52 so that one end abuts washer 60. Clamp member 16 is then mounted to bolt 52 by passing threaded shaft 56 through opening 50 in central portion 38 so that the end of coil spring 58 opposite washer 60 abuts central portion 38. A washer 62 is then placed on threaded shaft 56 and a nut or knob 64 is tightened on to threaded shaft 56. To accomplish this, knob 64 has a threaded axial passageway 66 which matably receives threaded shaft 56 so that knob 64 may be rotatably tightened on to the end of bolt 52. Knob 64 is generally circular in shape with a plurality of upper wings 68 to facilitate manual gripping whereby adjustment of knob 64 on bolt 52 can readily take place. To this end, axial passageway 66 extends entirely through knob 64 to permit a large degree of adjustment along bolt 52. Further, both opening 50 and step-bored hole 32 are dimensioned to be larger that bolt 52 so that bolt 52 is received in hole 32 and opening 50 in loose fitting engagement to permit a small amount of play of clamp member 16 about bolt 52 and a slight pivoting of bolt 52 with respect to base plate 14. Further, since bolt 52 is circular in cross-section, clamp member 16 is rotatable about the longitudinal axis of bolt 52 so that it may rotate into and out of alignment with a work piece 12 as is shown in FIG. 1.

The end of clamp member 16 forming heel 40 is also movable with respect to base plate 14, and, to accomplish this, heel 40 includes a hub 70 which is generally cylindrical in shape and oriented perpendicularly to base plate 14 when clamp member 16 is connected thereto. A threaded bore 72 extends through heel 40 and hub 70 so that it is oriented axially of hub 70. Bore 72 receives a threaded bolt 74 which has an enlarged head 76 and a rounded nose 78 opposite head 76. Enlarged head 76 is generally circular in cross-section and includes a plurality of laterally projecting wings 80 adapted to facilitate gripping by the hand of the user. When head 76 is turned, bolt 74 advances into and out of bore 72. Accordingly, nose 78 is advanced toward and away from base plate 14 when clamp member 16 is secured thereto. A dimple 82 is provided in surface 36 of base plate 14, annd dimple 82 receives rounded nose 78 of bolt 76 as bolt 76 is advanced through bore 72.

The operation or clamping action of the device should now more readily be appreciated. First, clamp assembly 10 is mounted to the work bed or table of a machine to be operated by securing base plate 14 thereto by means of bolts 24 and 26 so that fingers 44 normally project to a position adjacent the desired location of a work piece. Bolt 74 is then loosened or withdrawn from bore 72 so that rounded nose 78 moves out of dimple 82 and into the interior of heel 40. Knob 64 is then loosened so that spring 58 may bias clamp member 16 away from base plate 14 to move fingers 44 upwardly and away from the work bed 18 of the machine to be used. If desired, clamp arm 16 may be rotated about bolt 52 so that fingers 44 are moved angularly away from the location of the work to be performed by the machine, but, in any event, the work piece 12 is placed at the desired location and fingers 44 are then positioned above work piece 12 prior to clamping.

In order to fimly clamp work piece 12 to bed 18, then, knob 64 is turned clockwise on bolt 52 so that it draws bolt 52 through central portion 38 of clamp arm 16 thus moving central portion 38 toward base plate 14 and correspondingly moving fingers 44 so that they contact an upper surface of work piece 12. Heel 40 is structured to have a center of mass between heel 40 and central portion 38 so that the spring action of spring 58 maintains heel 40 in an abutting relationship with base plate 14. Once knob 64 is tightened so that work piece 12 is firmly gripped by fingers 44, additional clamping force can be provided by turning head 76 in a clockwise direction to advance bolt 74 through bore 72. This causes rounded nose 78 to protrude out of bore 72 and to abut base plate 14 in dimple 82. Accordingly, as bolt 76 is advanced in this direction, heel 40 is moved upwardly away from base plate 14, and, due to the corresponding lever action of clamp member 16 about bolt 52, fingers 44 are more forcefully moved against work piece 12. To this end, it should be noted that clamp member 16 is slightly pivotal with respect to base plate 14 because of the loose fitting engagement of bolt 52 in step-bored hole 32 and in opening 50.

It should then be understood that the above described structure provides a base plate and a clamp arm which are interconnected by a movable fulcrum means defined by fulcrum post or bolt 52 and adjustable knob 62. Bolt 74 provides an adjustment means associated with the heel portion of clamp arm to allow forced movement of heel portion 40 away from base plate 14 and to permit return of heel portion 40 in a direction toward base plate 14 when the clamp arm is mounted to the base plate. Of course, other structural equivalents for bolt 52 and knob 64 are possible as long as the central portion of clamp member 16 is movable in a direction toward and away from base plate 14. Other structures or mechanisms can also be provided to forcefully move heel 40 away from base plate 14. Several such structures different from bolt 74 are discussed below in the following description of alternative embodiments of this invention.

Figure 5:
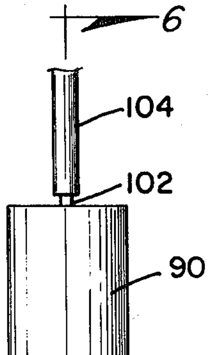
FIG. 5 is a side view in elevation of a first alternate embodiment of a machine clamp according to the present invention.
Figure 5:
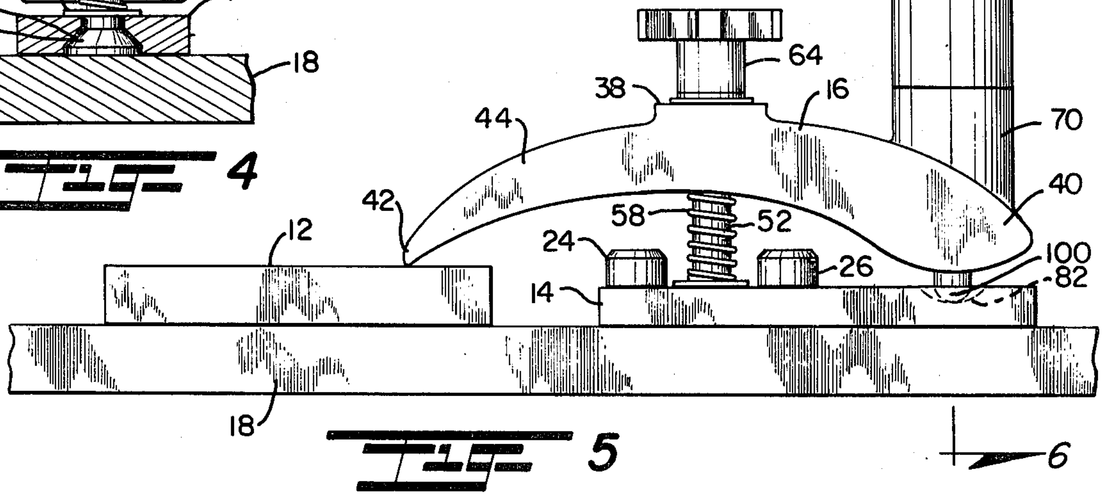
Figure 6:
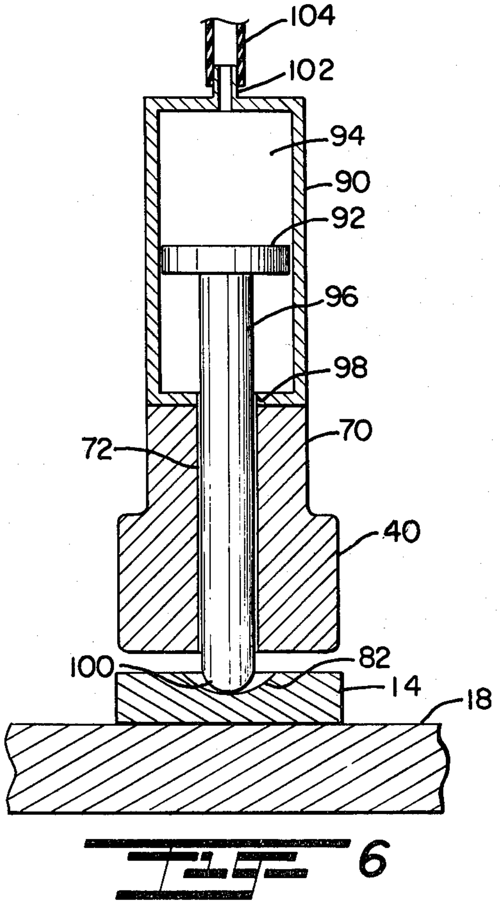
FIG. 6 is a cross-sectional view taken about line 6—6 of FIG. 5.

For example, in the first alternate embodiment of the present invention shown in FIGS. 5 and 6, a hydraulic cylinder is provided such that the piston rod of the hydraulic cylinder replaces bolt 74. Specifically, as is shown in FIGS. 5 and 6, a hydraulic cylinder 90 is attached in any convenient manner to hub 70 of clamp assembly 10, such as by welding or the like. Hydraulic cylinder 90 is shown in simplified construction in FIG. 6 and includes a cylindrical piston head 92 positioned in cylindrical cavity 94. A piston rod 96 which extends through opening 98 in cylinder 90 and continues through bore 72 in hub 70 and heel 40. To this end, bore 72, in the first alternate embodiment, is smooth bored rather than threaded so that cylindrical piston rod 96 may smoothly and easily reciprocate therethrough. Piston rod 96 terminates in a rounded end 100 opposite piston head 92 with rounded end 100 being received by dimple 82 in base plate 14. A nipper 102 defines an inlet and an outlet opening for hydraulic cylinder 90 and a fluid line 104 may be secured to nipple 102 in any convenient manner. While the construction shown in FIGS. 5 and 6 for hydraulic cylinder 90 is believed to be somewhat simplified, construction of more sophisticated hydraulic cylinders is well known in the art and is not a part of this invention. Hydraulic cylinder 90 could easily be replaced by a similarly operating pneumatic cylinder or other mechanism.

In operation, work piece 12 is gripped by the movable fulcrum defined by bolt 52 and knob 64 in a manner identical to that described with respect to the preferred embodiment. Once work piece 12 is gripped firmly by fingers 44, additional gripping force is supplied by activating hydraulic cylinder 90 in a standard fashion known in the art. To this end, hydraulic fluid is pumped through fluid line 104 from an external reservoir and pump mechanism (not shown) so that it may pass through nipple 102 into cavity 94 of hydraulic cylinder 90. This pressurized hydraulic cylinder 90 to drive piston head 92 in a downward direction as is shown in FIG. 6 so that rounded end 100 of piston rod 96 is forced against base plate 14 and dimple 82. This, then, provides the lever action to further clamp work piece 12 to work bed 18 of the machine to be operated. When it is desired to release work piece 12, pressure in hydraulic cylinder 90 is released to allow piston rod 96 to retract as piston head 92 moves upwardly in cylinder 90, and knob 64 may then be loosened by turning in a counterclockwise position and clamp arm 16 rotated out of engagement with work piece 12.

The second alternate embodiment of the present invention is shown in FIGS. 7–10, and provides two structural modifications to the preferred embodiment of the present invention discussed above with respect to FIGS. 1–4. Particularly, in the second alternate embodiment of the present invention, a second type of adjustment mechanism for supplying additional clamping force to work piece 12 is disclosed, and a slide bracket mounting for base plate 14 is provided as well. It should be understood, though, that this slide bracket mounting could be provided for both embodiments discussed above.

As may be seen in FIGS. 7–10, a slide bracket 110 is mounted to work bed 18 by means of a pair of screws 112. Modified base plate 114 is then received by slide bracket 110 so that it may slide in a longitudinal direction therealong. Specifically, slide bracket 110 is provided with a longitudinal channel 116 which is trapezoidal in cross-section, or, in other words, channel 116 has a dove-tail configuration. Base plate 114 has a complimentary dove-tail ridge 118 positioned longitudinally on surface 120 facing slide bracket 110. Thus, base plate 114 may be positioned at a selected longitudinal orientation with respect to slide bracket 110 by moving it longitudinally along the upper surface thereof. Dove-tailed rib 118 and channel 116, then, guide the motion of base plate 114 with respect to slide bracket 110.

The second alternate embodiment shown in FIGS. 7–10 also includes a second construction for an adjustment mechanism to provide additional clamping force on work piece 112 by selectively and forcefully moving heel 40 away from base plate 114. In this second construction of this adjustment means, heel 40 is bifurcated into a pair of wings 122 so that a slot 124 is formed therebetween. A cammed lever 126 is then mounted between wings 122 on an axle 128. Cammed lever 126 has a cam 130 at one end thereof and a lever arm 132 extending from cam 130. Cam 130 has a transverse hole 134 which receives axle 128, and axle 128 is maintained in position by means of flared ends 136. In this manner, cammed lever 126 is rotatable about the axis of axle 128. Base plate 114 is provided with an oval shaped dimple 138 adapted to receive cam 130 as described below.

Figure 7:
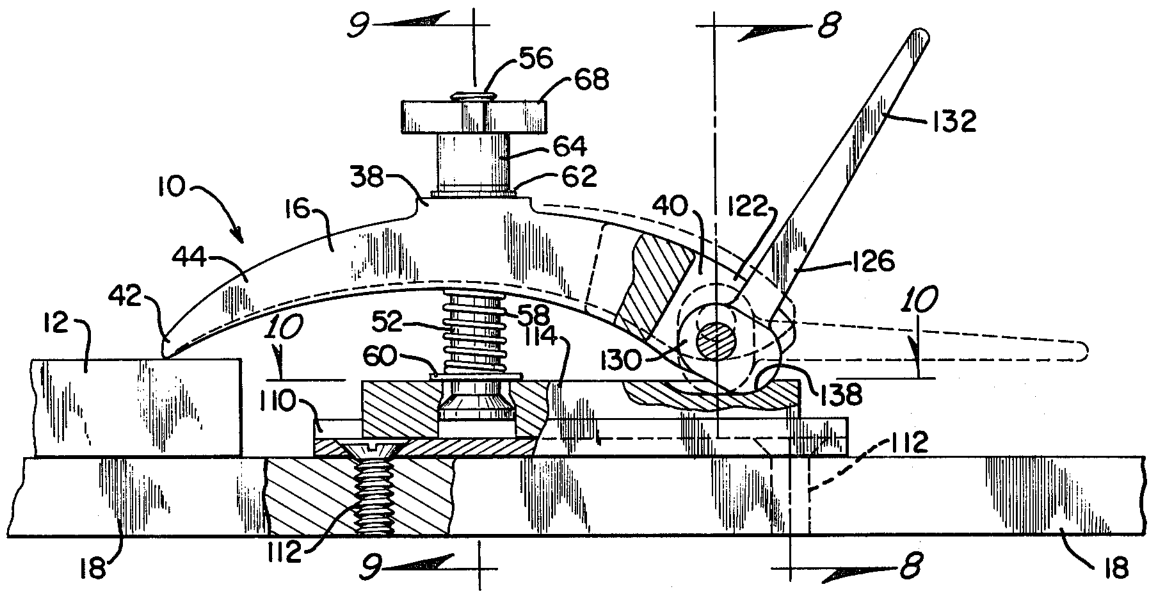
FIG. 7 is a side elevational view in partial cross-section of a machine clamp according to a second alternate embodiment of the present invention.
Figure 9:
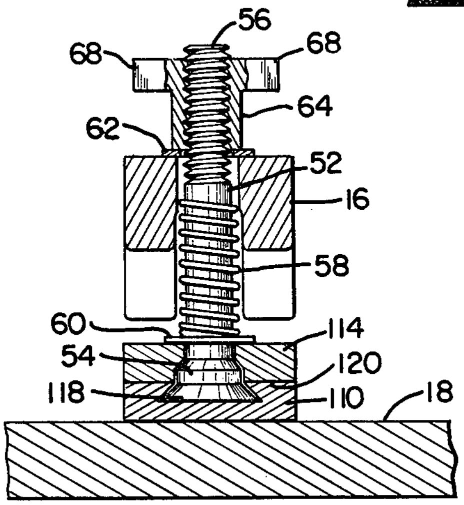
FIG. 9 is a view in partial cross-section taken about line 9—9 of FIG. 7.
Figure 8:
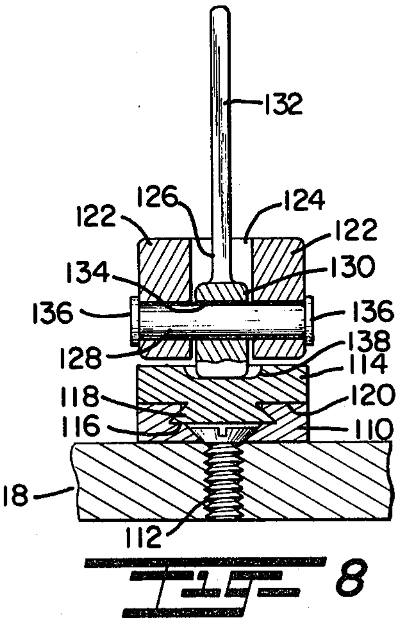
FIG. 8 is a cross-sectional view taken about line 8—8 of FIG. 7.
Figure 10:
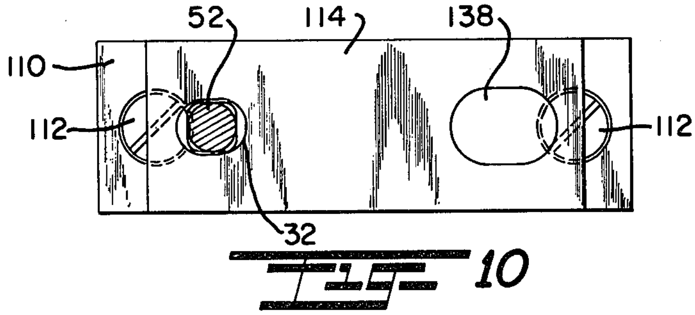
FIG. 10 is a top plan view taken along line 10—10 of FIG. 7.

The operation of the second alternate embodiment of the present invention is identical to that described with respect to the preferred embodiment except that clamping device 10 is first oriented in a desired longitudinal direction by sliding base plate 114 along slide bracket 110. Then, knob 64 is adjusted so that clamp fingers 44 firmly engage work piece 12 as is shown in FIG. 7. Once this is accomplished, lever arm 32 is operated to rotate cam 130 on axle 128 so that cam 130 pivots into dimple 138 as is shown in phantom in FIG. 7. This, of course, forcefully raises heel 40 in a direction away from base plate 114 to cause fingers 44 to place additional clamping pressure on work piece 12. When it is desired to release work piece 12, lever arm 132 is simply moved to a vertical position to rotate cam 130 out of dimple 138, and knob 64 is then loosened to remove work piece 12.

While the present invention has been described with some degree of particularity, it should be appreciated that the present invention is defined by the following claims construed in light of the prior art so that modifications or changes may be made to the preferred embodiment of the present invention without departing from the inventive concepts contained herein.

I claim:

1. A machine clamp adapted for gripping a work piece, comprising:

a base plate having first and second ends;

an upright guide post secured to said base plate;

a clamp member having a central portion receiving said guide post, a heel end positioned over said first end of said base plate, and a pair of parallel elongated curved fingers extending from said heel end in an arch shape and having a slot therebetween, said fingers each terminating in a free end and said central portion being defined by a brace block extending across said slot and formed integrally with and as a solid extension of said fingers;

first adjustment means associated with said guide post for moving said central portion toward and away from said base plate; and second adjustment means associated with said heel end for selectively moving said heel end away from said base plate and permitting return of said heel end in a direction toward said base plate.

2. A machine clamp according to claim 1 wherein said clamp member is rotatably mounted to said guide post.

3. A machine clamp according to claim 2 wherein said guide post is pivotally mounted to said base plate.

4. A machine clamp according to claim 1 wherein said central portion of said clamp member has a first bore, said guide post extending through said first bore in loose-fitting engagement therewith.

5. A machine clamp according to claim 4 wherein said guide post has a threaded portion on a side of said clamp member opposite said base plate, said first adjustment means including a nut threadably received on said threaded portion.

6. A machine clamp according to claim 1, including spring bias means associated with said clamp member for biasing said clamp member in a direction away from said base plate.

7. A machine clamp according to claim 6 wherein said spring bias means includes a spring surrounding said guide post between said base plate and said clamp member.

8. A machine clamp according to claim 1 wherein said heel end has a threaded bore oriented perpendicularly to said base plate when said clamp member is mounted thereon, said second adjustment means including a threaded bolt threadably received by said threaded bore and extending therethrough and having a first end abutting said base plate and a second end terminating in an enlarged knob.

9. A machine clamp according to claim 8 wherein said base plate first end has a concave dimple configured for receiving said first end of said bolt.

10. A machine clamp according to claim 1 wherein said second adjustment means includes a hydraulic cylinder mounted to said heel end and having a piston rod abutting said base plate whereby extension of said rod from said hydraulic cylinder forces said heel end away from said base plate.

11. A machine clamp according to claim 10 wherein said clamp member has a second bore extending through said heel end in a direction perpendicular to said base plate when said clamp member is mounted thereon, said hydraulic cylinder being mounted on said heel portion on a side opposite said base plate, said piston rod extending through said second bore and terminating in a free end adapted to abut said base plate first end.

12. A machine clamp according to claim 1 wherein said second adjustment means includes a cam member rotatably mounted to said heel end and operative against said base plate, said cam member having an elongated lever connected thereto whereby movement of said lever in one direction rotates said cam to move said heel end away from said base plate and movement of said lever in an opposite direction permits movement of said heel portion toward said base plate.

13. A machine clamp according to claim 1 wherein said fingers each extend away from said base plate to a location in spaced-relation beyond said second end of said base plate opposite said first end.

14. A machine clamp according to claim 1 including a slide bracket adapted to be mounted to a mounting surface, said base plate being slidable secured by said slide bracket.

15. A machine clamp according to claim 14 wherein said slide bracket has a dove-tail channel formed longitudinally therein, said base plate including a dove-tail rib configured to be slideably received in said channel.

16. A machine clamp adapted for gripping a work piece, comprising:

an elongated slide bracket adapted to be mounted on a working surface and having a longitudinal channel formed therein;

a base plate slidably mounted to said slide bracket and relatively movable therealong, said base plate including a longitudinal rib positively engaging said channel;

a clamp arm having a gripping end, a heel end, and a central portion, said gripping end dimensioned to extend beyond one edge of said base plate;

movable fulcrum means interconnecting said central portion and said base plate for moving said central portion toward and away from said base plate; and adjustment means associated with said heel portion for moving said heel portion toward and away from said base plate.

17. A machine clamp according to claim 16 including bias means associated with said base plate and said clamp arm for biasing said clamp arm in a direction away from said base plate.

18. A machine clamp according to claim 16 wherein said clamp arm is rotatable about an axis defined by a line substantially perpendicular to the plane of said base plate and passing through said central portion.

19. A machine clamp adapted for gripping a work piece, comprising:

a base plate;

an upright fulcrum post secured to a first end portion of said base plate and projecting in a substantially perpendicular direction to the plane thereof, said fulcrum post pivotable through at least small acute angles with respect to said perpendicular direction, said fulcrum post having a threaded portion at an end opposite said base plate;

an arcuate clamp member having a heel end positioned over a second end portion of said base plate, a pair of parallel elongated gripping fingers opposite said heel end and projecting forwardly of the first end portion of said base plate, and a central portion formed unitarily with said gripping fingers and having a bore therethrough and adapted for receiving said fulcrum post in loose-fitting, mated relation, said clamp member defining an arch above said base plate an being rotatable about said fulcrum post;

a spring positioned in surrounding relation to said guide post between said base plate and said clamp member and operative to bias said clamp member and said base plate away from one another;

an adjusting knob threadably received on said fulcrum post on a side of said clamp member opposite said base plate; and adjustment means associated with said heel end for selectively moving said heel end away from said base plate and permitting return of said heel end in a direction toward said base plate.

20. A machine clamp according to claim 16 or 19 wherein said adjustment means includes a bolt passing through said heel end, said heel end being enlarged with respect to said gripping end.

21. A machine clamp according to claim 16 or 19 wherein said adjustment means includes a hydraulic cylinder.

22. A machine clamp according to claim 16 or 19 wherein said adjustment means includes a cam member.

* * * * *